US010739260B2

(12) United States Patent
Obara et al.

(10) Patent No.: US 10,739,260 B2
(45) Date of Patent: Aug. 11, 2020

(54) OPTICAL ANALYZING DEVICE

(71) Applicant: Hitachi High-Technologies Corporation, Tokyo (JP)

(72) Inventors: Takayuki Obara, Tokyo (JP); Muneo Maeshima, Tokyo (JP); Kazumichi Imai, Tokyo (JP); Yohei Hanazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 217 days.

(21) Appl. No.: 15/542,447

(22) PCT Filed: Jan. 26, 2015

(86) PCT No.: PCT/JP2015/051955
§ 371 (c)(1),
(2) Date: Jul. 10, 2017

(87) PCT Pub. No.: WO2016/120951
PCT Pub. Date: Aug. 4, 2016

(65) Prior Publication Data
US 2018/0275053 A1  Sep. 27, 2018

(51) Int. Cl.
*G01N 21/552* (2014.01)
*G01N 1/38* (2006.01)
(52) U.S. Cl.
CPC .............. *G01N 21/553* (2013.01); *G01N 1/38* (2013.01); *G01N 2201/0638* (2013.01); *G01N 2201/08* (2013.01)
(58) Field of Classification Search
CPC ......... G01N 21/553; G01N 2201/0638; G01N 2201/08; B01N 1/38
See application file for complete search history.

(56) References Cited

U.S. PATENT DOCUMENTS 6,738,141 B1  5/2004 Thirstrup
2005/0100904 A1  5/2005 Yoshizato et al.
(Continued)

FOREIGN PATENT DOCUMENTS

JP   2002-085089 A    3/2002
JP   2002-536638 A   10/2002
(Continued)

OTHER PUBLICATIONS

Machine Translation of JP 2008-083036 A (Year: 2019).*
International Search Report of PCT/JP2015/051955 dated Apr. 21, 2015.

*Primary Examiner* — Michael L Hobbs
(74) *Attorney, Agent, or Firm* — Mattingly & Malur, PC

(57) ABSTRACT

This optical analyzing device is provided with a light source, a detector, a substrate having a metal film on at least one surface thereof, and an optical element for introducing a light beam from the light source to the substrate and delivering the light beam from the substrate toward the detector. A plurality of sample regions for holding samples are provided on the metal film; and a portion of the light beam from the light source is irradiated to any one of the sample regions, is reflected, at least once, by the surface of the substrate on the opposite side of the side on which the sample regions are provided, and is not irradiated to a sample region other than the aforementioned sample region in the path thereof until the portion of the light beam is delivered by the optical element.

15 Claims, 7 Drawing Sheets

(56) References Cited

U.S. PATENT DOCUMENTS

2010/0238443 A1* 9/2010 Claypool ............. G01N 21/553
356/369
2012/0264233 A1* 10/2012 Jansson ............... B01F 13/0072
436/501

FOREIGN PATENT DOCUMENTS

| JP | 2008-083036 A | 4/2008 | |
| JP | 2008083036 * | 10/2008 | ............... G01N 5/02 |
| JP | 2009-139279 A | 6/2009 | |
| JP | 2011-193752 A | 10/2011 | |
| WO | 2011/115189 A1 | 9/2011 | |
| WO | WO-2014209227 A1 * | 12/2014 | ........... G01N 21/553 |

* cited by examiner

[Fig. 1]
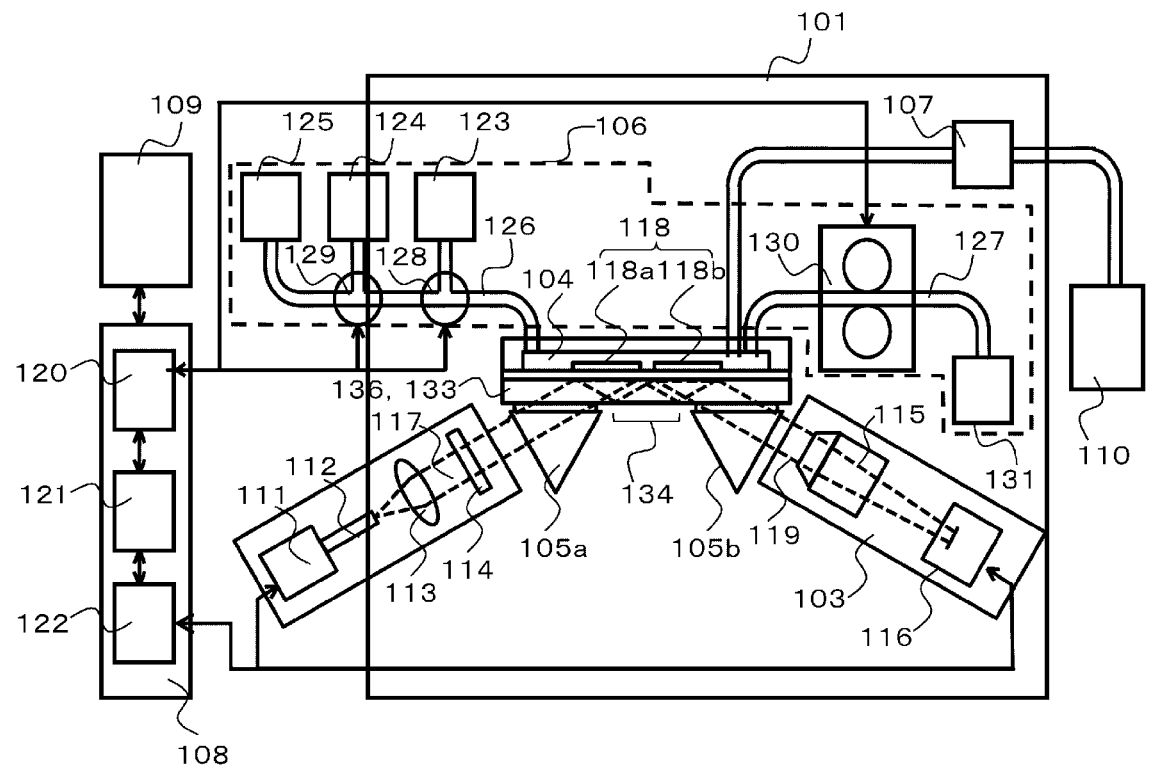
[Fig. 2a]
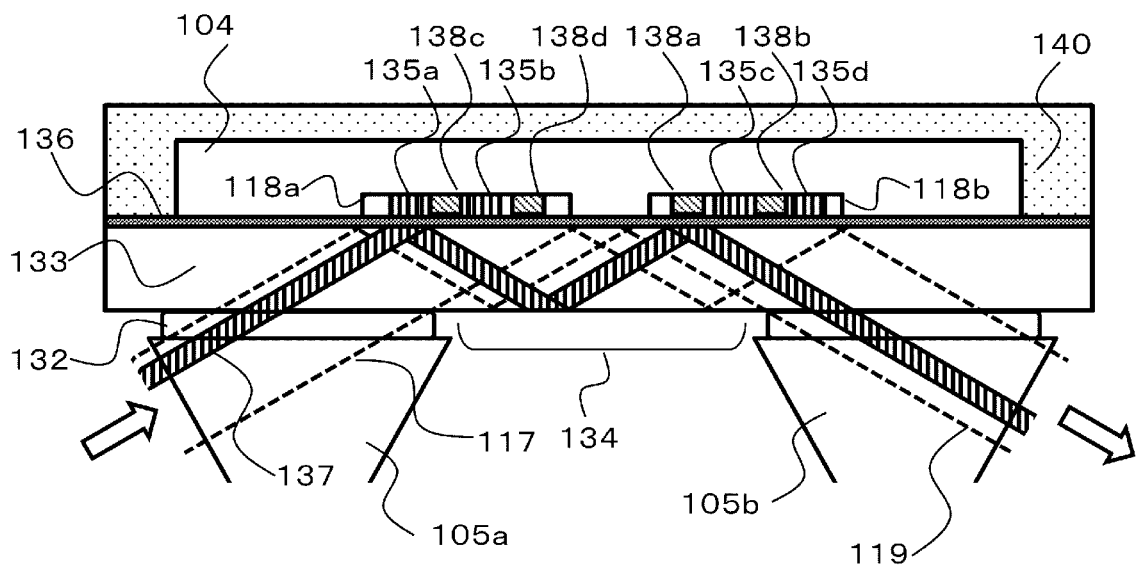

[Fig. 2b]
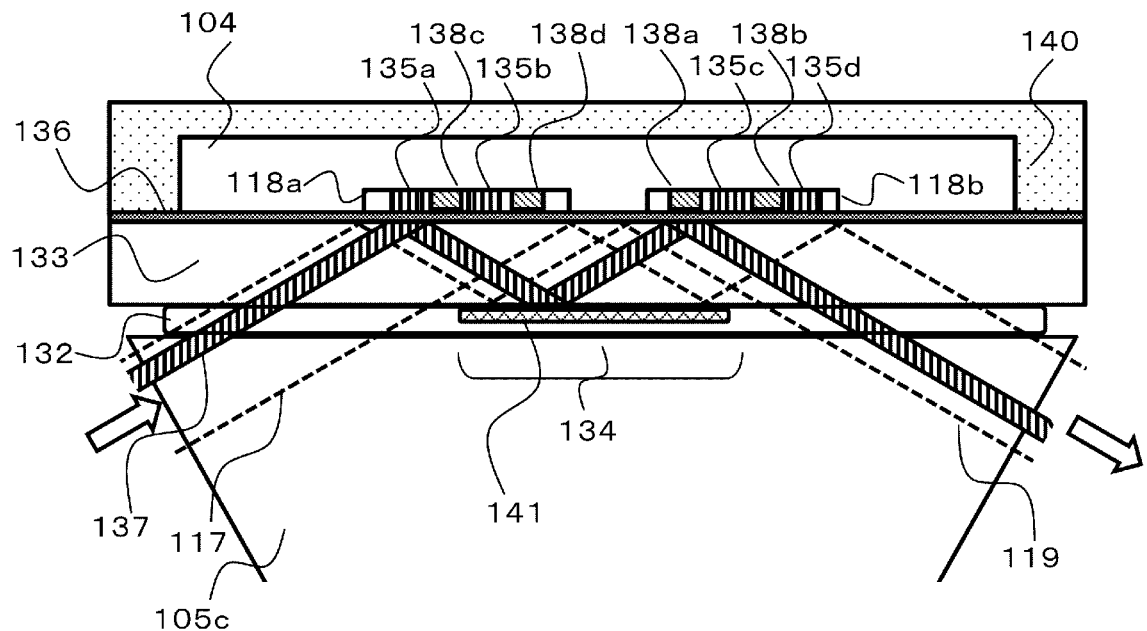
[Fig. 2c]
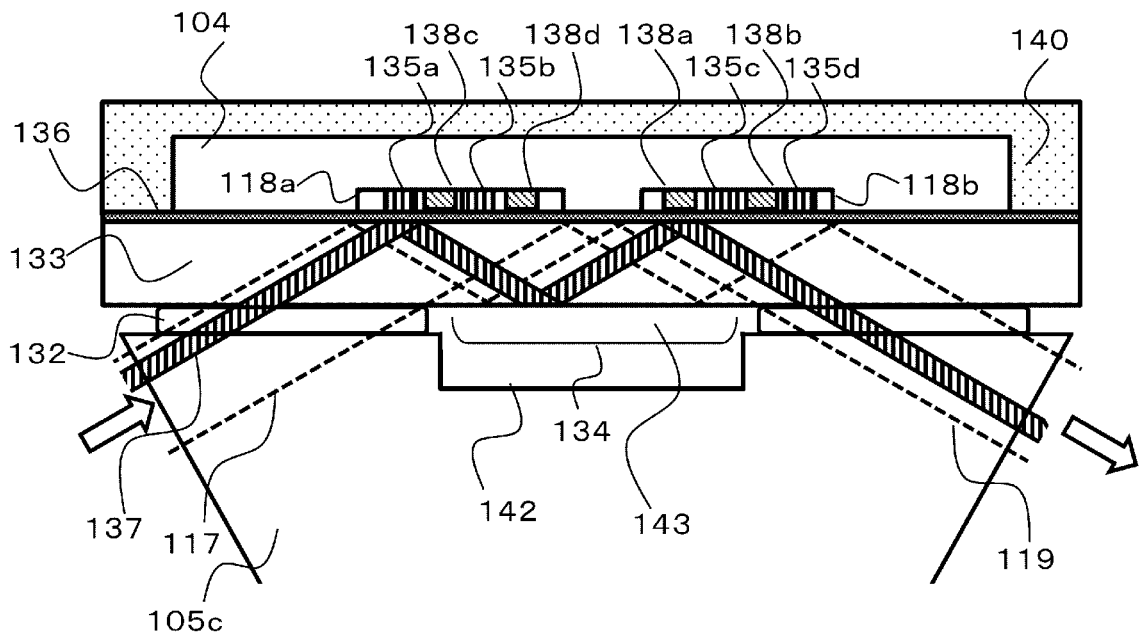

[Fig. 2d]
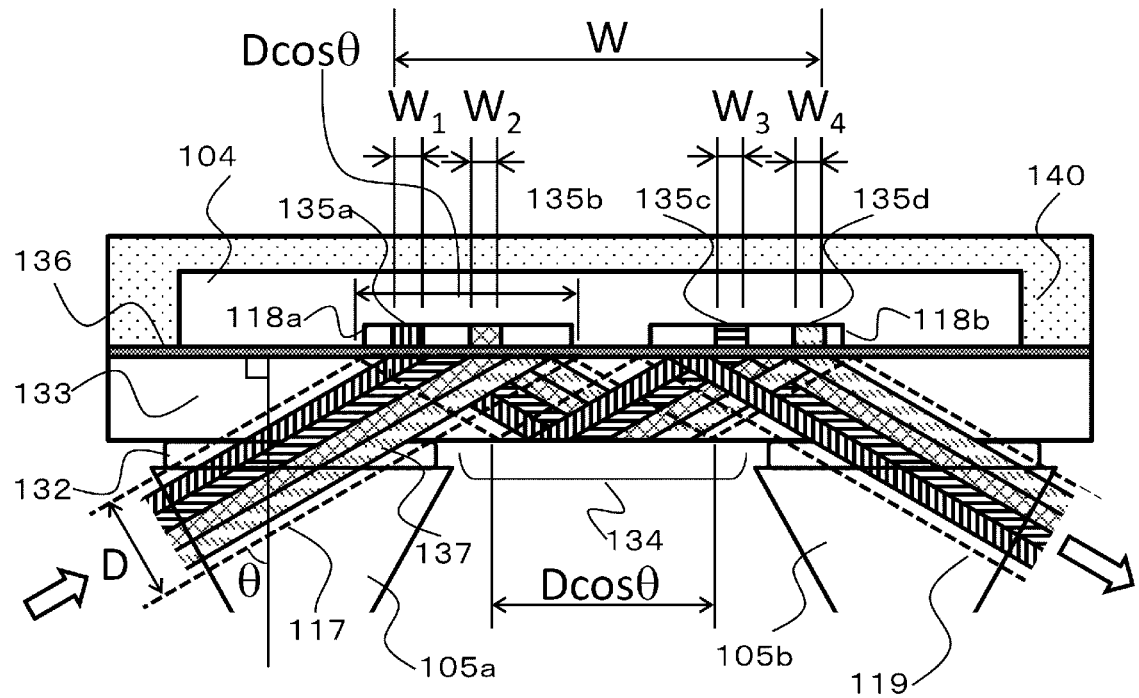
[Fig. 3]
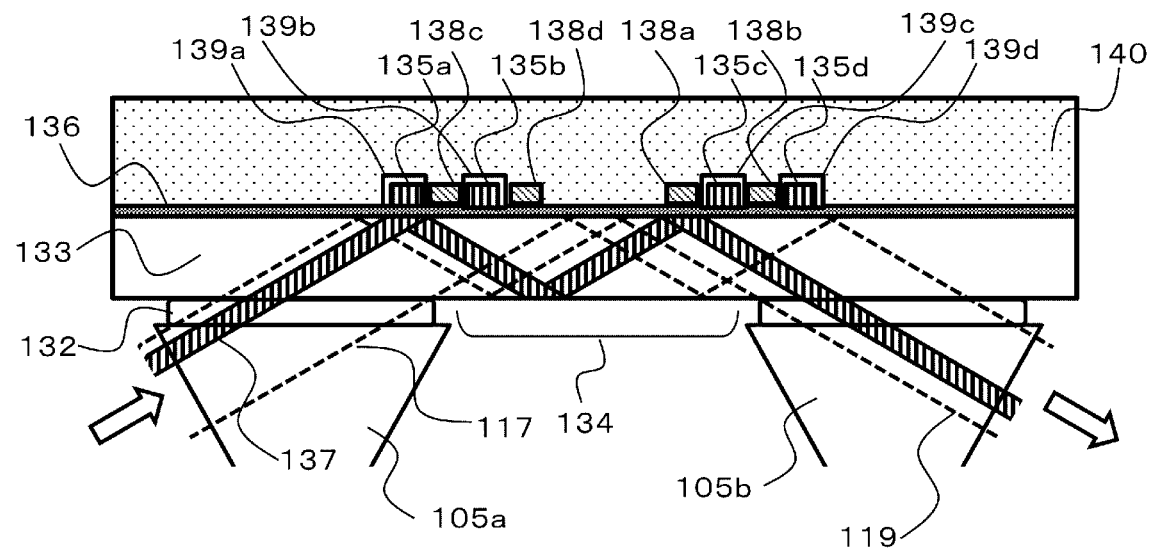

[Fig. 4]
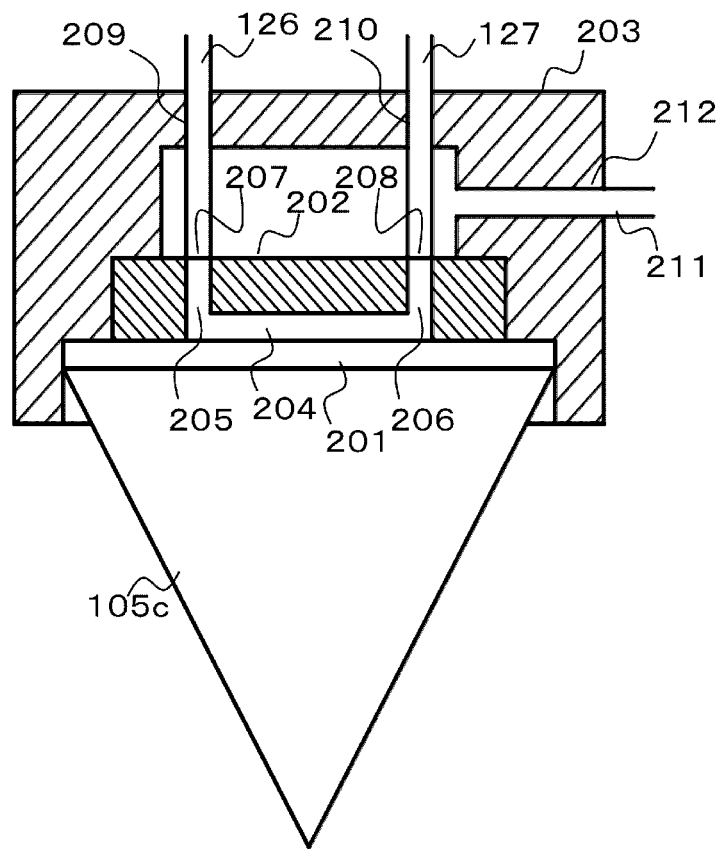

[Fig. 5]
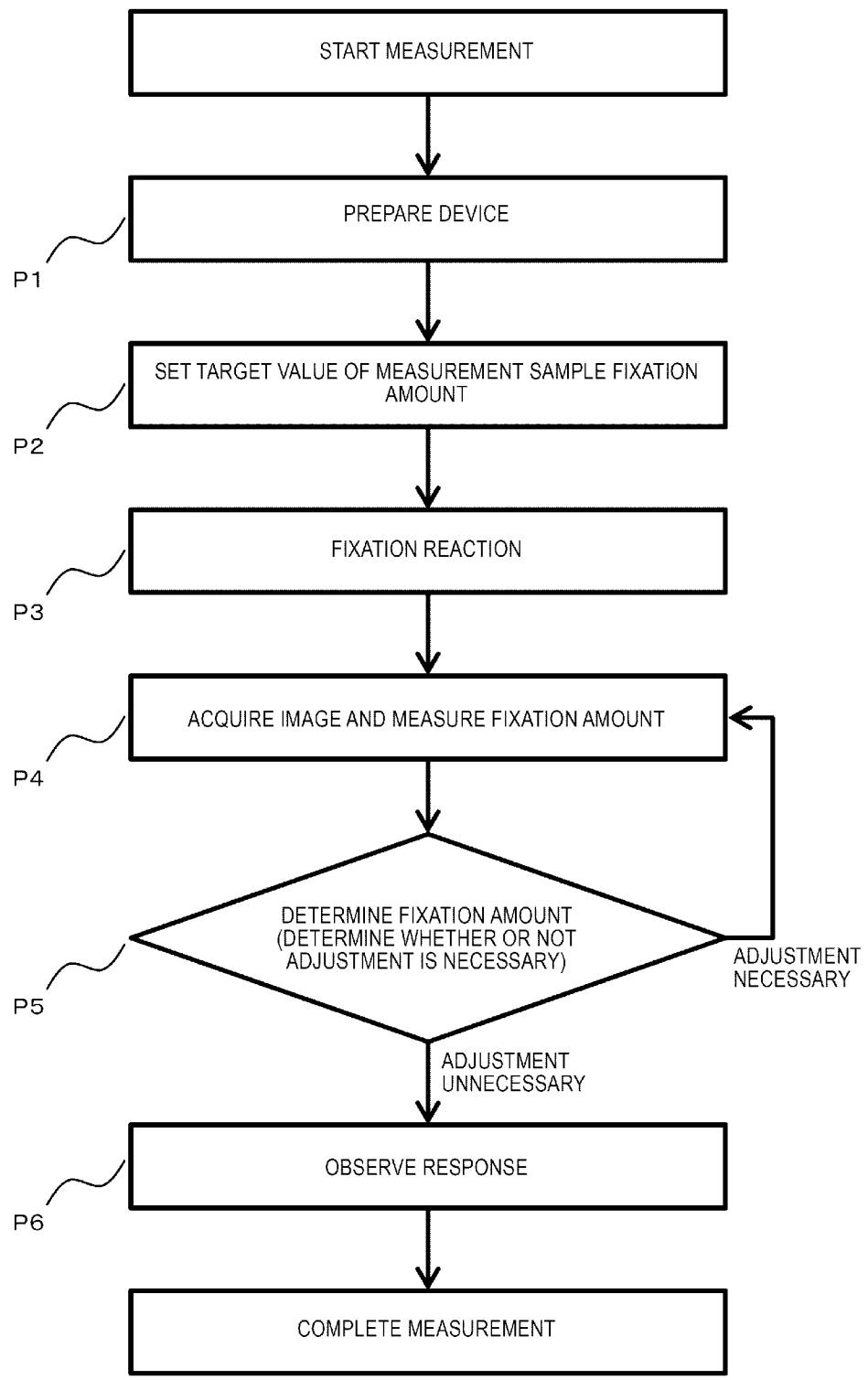

[Fig. 6]
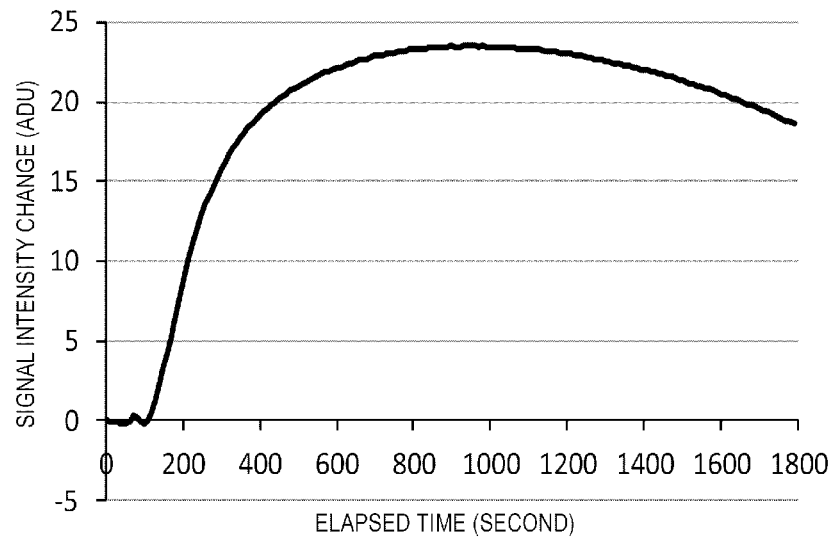
[Fig. 7]
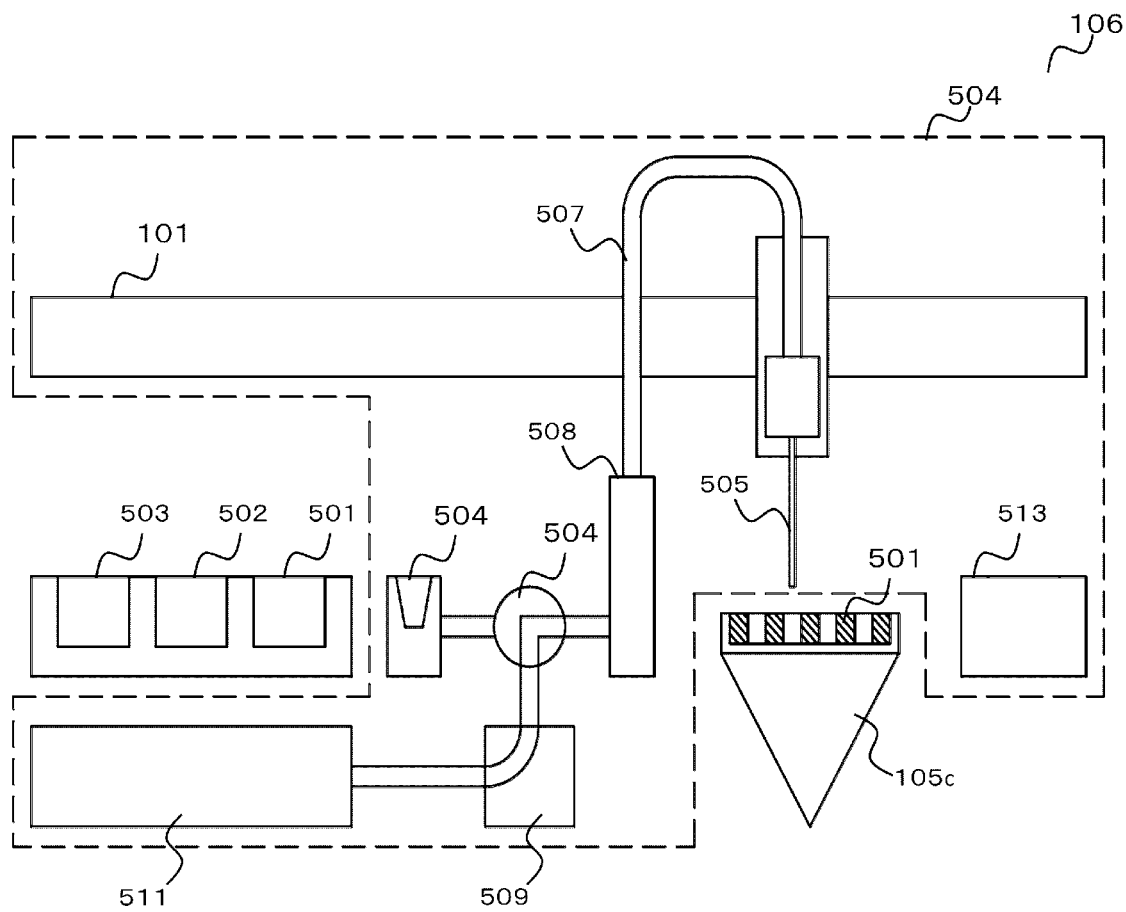

[Fig. 8]
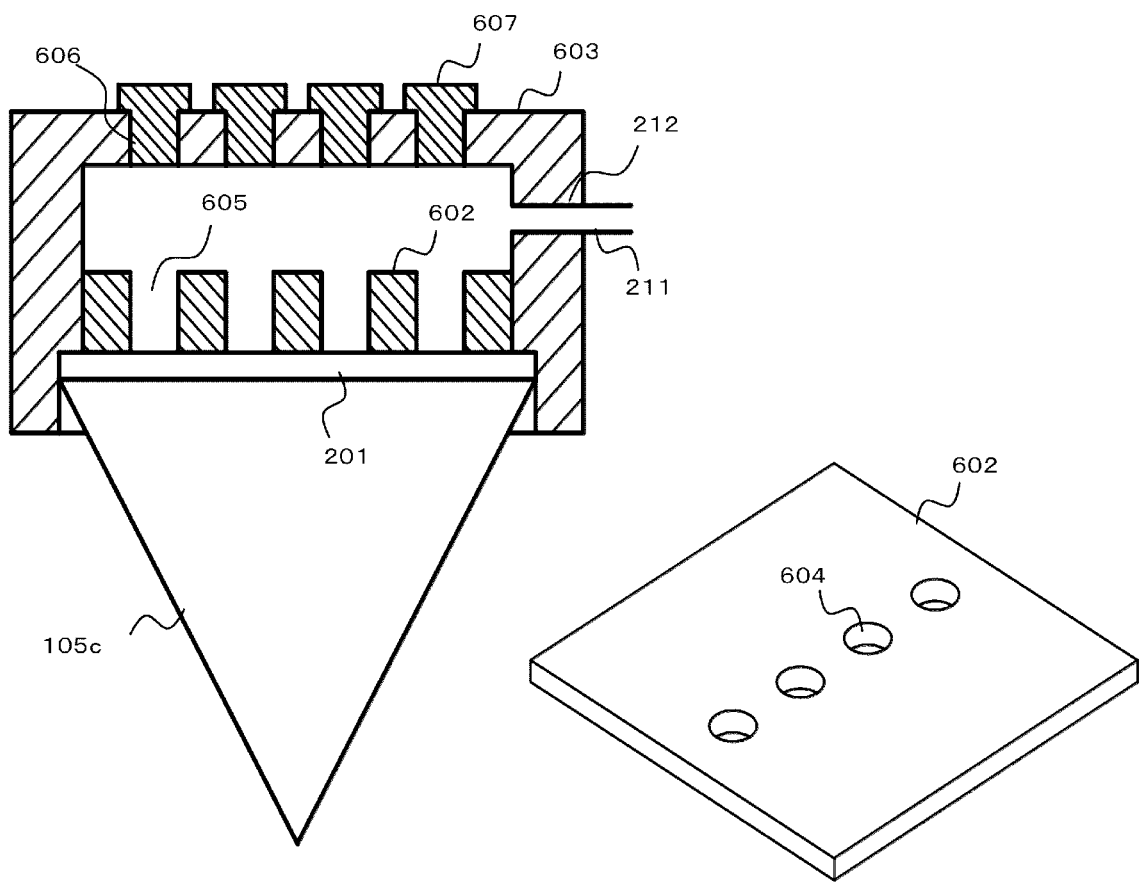

OPTICAL ANALYZING DEVICE

TECHNICAL FIELD

The present invention relates to a device for analyzing properties of a substance or a living body. The invention particularly relates to a device for measuring what kind of response a biological sample such as a cell shows to a stimulus.

BACKGROUND ART

For the sake of drug discovery, as a method for screening an effective drug, a technique (cell based assay) has been widely employed which determines whether or not a living cell is susceptible to a drug. In the related art, when an effect of the drug is conveniently evaluated, a method has been used which determines whether or not a target molecule physically binds to a target drug. In contrast, a physiological response of a cell serving as a target of the drug is directly measured, thereby enabling the effect of the drug to be more accurately evaluated.

This cell based assay technique is used not only for the drug discovery but also in various fields. For example, as an allergy test, it is possible to determine whether a patient responds to a specific allergen or to determine a possibility that a certain substance causes an allergic reaction. In addition, when a medicine such as an anticancer drug is administered, this technique is also applicable to personalized medicines for selecting and administering the most effective drug.

A typical procedure for the cell based assay technique is as follows. First, cells serving as a measurement sample are cultured or collected from a subject. Next, the cells are fixed to a surface of a substrate such as a sensor chip. Then, a reaction reagent is added and brought into contact with the measurement sample. The cells are observed and measured using means such as a fluorescence microscope. In this manner, the obtained data is analyzed so as to determine whether or not there is a change in the cells or how big the cells are. As a method of observing and measuring the response from the cells, a method of using surface plasmon resonance (SPR) has been recently used in the above-described biology, in addition to a general fluorescence observation method.

PTL 1 discloses a technique in which an SPR imaging method applying SPR is used as the cell based assay method so as to observe and measure the response from the cells. Laser light incident on a glass substrate is incident on an interface F between the glass substrate and a thin metal film at an incidence angle θ=56° which satisfies the total reflection condition and generates a phenomenon of the surface plasmon resonance. The laser light reflected on the interface F is emitted from the glass substrate and a prism, and is incident on an objective lens. The objective lens magnifies an object image at a predetermined magnification, and forms an image on an image plane. The laser light emitted from the objective lens reaches the image plane of an imaging unit. For example, the imaging unit is a charge coupled device (CCD) image sensor or a complementary metal oxide semiconductor (CMOS) image sensor. An intensity image corresponding to the two-dimensional intensity distribution of reflected light of a parallel beam incident on the interface F of the prism, that is, a reflection intensity image is formed on an image plane of the imaging unit. Living cells C1 and C2 which are measurement targets of the active reaction are attached onto a surface (one surface) on a side opposite to the interface F in the thin metal film. A flow cell serving as a channel through which a liquid flows is disposed on the thin metal film. The flow cell is a channel through which the liquid to be exposed to living cells C1 and C2 set on the thin metal film flows. The flow cell is connected to a liquid supply unit. The liquid to be exposed to the living cells C1 and C2 is supplied into the flow cell from the liquid supply unit. FIGS. 4(A) to 4(C) in PTL 1 illustrate changes in images of the reflection intensity images after 0 minutes, 10 minutes, and 20 minutes from when the living cells C1 and C2 are not stimulated. FIGS. 5(A) to 5(C) in PTL 1 illustrate changes in images of the reflection intensity images after 0 minutes, 10 minutes, and 20 minutes from when the living cells C1 and C2 are stimulated. As is apparent from the comparison between FIGS. 4 (A) to 4(C) and FIGS. 5(A) to 5(C), it is understood that if the living cells C1 and C2 react to an external stimulus, luminance of a portion corresponding to the living cells C1 and C2 is changed.

In addition, PTL 1 also discloses a technique for improving the throughput by concurrently analyzing a plurality of cells in a multi-well chamber and a plurality of stimuli in an imaging field of view of SPR. A basophilic solution is injected into the multi-well chamber (for example, those which have empty wells formed in a matrix shape so that an injected solution is isolated) as illustrated in FIG. 11(A) in PTL 1, by using a liquid droplet ejecting device as described when the external stimulus is ejected or by means of pipetting. Furthermore, an allergen administrating multi-chamber designed to match the multi-well chamber into which the basophilic solution is injected is also prepared. This allergen administrating multi-chamber is configured similarly to the above-described liquid droplet ejecting device. Different allergens are preferably concurrently administered to each well into which blood is injected. Therefore, the disclosed technique utilizes a cell activity analyzing device and a cell activity analysis method according to the present embodiment.

CITATION LIST

Patent Literature

PTL 1: JP-A-2011-193752
PTL 2: Japanese Patent Application No. 2002-85089

SUMMARY OF INVENTION

Technical Problem

According to the technique disclosed in PTL 1, the cells are arranged in the multi-well chamber in the imaging field of view of SPR. In this manner, the cells having different conditions in a plurality of wells are concurrently observed, thereby attempting to improve the throughput. However, the number of the wells which can be observed at one time is limited to the size of the imaging field of view of SPR, and the size and the interval of the wells. Consequently, it is difficult to obtain a sufficiently improved throughput.

In order to solve the problem, the invention aims to substantially improve the throughput of a cell based assay based on optical measurement means such as SPR.

Solution to Problem

According to the invention, there is provided an optical analyzing device including a light source, a detector, a substrate that has a metal film on at least one surface thereof, and an optical element that introduces a light beam to the substrate from the light source, and that guides the light beam from the substrate to the detector. A plurality of sample regions for holding samples are disposed on the metal film. A portion of the light beam from the light source is emitted to any one of the sample regions, is reflected at least once on a surface opposite to a side having the sample region in the substrate, and is not emitted to other sample regions excluding the sample region in an optical path until the portion of the light beam is guided by the optical element.

Advantageous Effects of Invention

According to the above-described configuration, it is possible to reduce a width of a light beam bundle required for concurrently measuring a plurality of sample regions. In this manner, it is possible to reduce a size of a light source, a size of a lens, and a size of a detector.

BRIEF DESCRIPTION OF DRAWINGS

FIG. 1 illustrates a device configuration according to Embodiment 1.
FIG. 2a illustrates an example of a configuration around a measurement region according to Embodiment 1.
FIG. 2b illustrates an example of a configuration around the measurement region according to Embodiment 1.
FIG. 2c illustrates an example of a configuration around the measurement region according to Embodiment 1.
FIG. 2d illustrates an example of a configuration around the measurement region according to Embodiment 1.
FIG. 3 illustrates another example of a configuration around the measurement region according to Embodiment 1.
FIG. 4 illustrates a configuration around a flow cell according to Embodiment 1.
FIG. 5 illustrates a flowchart of an operation according to Embodiment 1.
FIG. 6 illustrates an analysis result according to Embodiment 1.
FIG. 7 illustrates a device configuration according to Embodiment 2.
FIG. 8 illustrates a configuration around a flow cell according to Embodiment 2.

DESCRIPTION OF EMBODIMENTS

Hereinafter, embodiments according to the invention will be described.

Embodiment 1

(Device Configuration)

A device configuration of Embodiment 1 is illustrated in FIG. 1. An analyzing device 101 includes an emission unit 102, a detection unit 103, a flow cell 104, a substrate 133, prisms 105a and 105b, and a liquid feeding unit 106. A metal film 136 is disposed on a surface of the substrate 133. An operation of the analyzing device 101 is controlled by a control PC 108. A monitor 109 is connected to the control PC 108 so as to display an analysis result and the like. In addition, the analyzing device 101 is provided with a temperature regulating device 107. The temperature of $CO_2$ gas supplied from a $CO_2$ gas cylinder 110 is adjusted by the temperature regulating device 107. In this manner, the temperature inside the analyzing device 101 can be partially or entirely adjusted, and $CO_2$ concentration can be optionally set.

(Description of Structure of Emission Unit/Detection Unit)

The emission unit 102 and the detection unit 103 will be described. The emission unit 102 is configured to include components such as a light source 111, an optical fiber 112, a collimating lens 113, and a polarizing element 114. In addition, the detection unit 103 is configured to include components such as an image forming lens 115 and an image sensor 116. The light source 111 is an excitation light source for SPR observation. Excitation light 117 emitted from the optical fiber 112 is collimated by the collimating lens 113, and is shaped into a parallel beam. In the excitation light 117 shaped into the parallel beam, an S-polarized light component is removed by the polarizing element 114, and only a P-polarized light component remains. The excitation light 117 changed to the P-polarized light is incident on the prism 105a. Thereafter, the excitation light 117 enters the inside of the substrate 133 from a rear side of the substrate 133, and is incident at an angle $\theta_1$ on a portion in contact with a first measurement region 118a on a surface side of the substrate 133. The excitation light 117 is reflected at the angle $\theta_1$, and reaches the rear side of the substrate 133. A specific region 134 which reflects light is disposed on the rear side surface of the substrate 133. For example, this configuration can be realized by total reflection on an interface between the substrate 133 and a surrounding medium (for example, air). Specifically, any configuration may be adopted as long as only air is in contact with the region 134 of the substrate 133 as illustrated in FIG. 1 so that index-matching oil and prisms are not present therein. Therefore, in this case, the light reaching the region 134 which reflects the light is totally reflected at an angle $\theta_{1R}$. Then, the light reaches the surface side of the substrate 133 again, and is incident at an angle $\theta_2$ on a portion in contact with a second measurement region 118b. The light is reflected at the same angle $\theta_2$, and is changed into reflected light 119. The reflected light 119 passes through the flow cell 104 and the prism 105b again, and is emitted outward from the prism 105b. The emitted reflected light is collimated by the image forming lens 115, and forms an image serving as a two-dimensional image on the image sensor 116. The image sensor 116 acquires the image, and transmits image data to the control PC 108. An analyzing unit 121 is present in the control PC 108, and analyzes the image data transmitted from the image sensor 116 so as to display a result thereof on the monitor 109. In addition, an aperture for changing an emission range of the excitation light may be disposed between the collimating lens 113 and the polarizing element 114. However, this aperture is omitted in FIG. 1.

An arrangement of the emission unit 102 and the detection unit 103 defines an incidence angle of the excitation light incident on the substrate 133 and a reflection angle of the reflected light reflected on the substrate 133 which is detected by the detection unit 103. In order to adjust these angles, the emission unit 102 and the detection unit 103 may be arranged on a drive stage which can employ any desired angle for the substrate 133. In this manner, it is possible to perform measurements under various conditions of the incidence angle and the reflection angle. As a preferable incidence angle for the measurement using SPR, in many cases, a resonance angle (also called a dip angle) at which the light is absorbed the most by SPR or an angle before and after the resonance angle is used. In this manner, it is possible to obtain high sensitivity to a refractive index of the samples. This preferable incidence angle can be defined by conditions such as the sample, a medium around the sample, a material of the substrate, a structure and surface state of the metal film disposed on the surface of the substrate. According to the above-described configuration which can obtain any desired incidence angle and reflection angle, a system is achieved which can deal with various combinations of the above-described conditions. For example, in a system of analyzing the cell as the sample, the optimum angle may be changed depending on a type or a state of cells (basophils, vascular endothelium cells, cells derived from human, or cells derived from rats), a composition of a buffer (pH buffer) around the cell, and the type of cell properties intended to be measured. Accordingly, the stage may be designed so as to be capable of obtaining a range of angles for covering analysis conditions of the presumed cell. Alternatively, a configuration may be adopted in which the preferable angle is automatically set by a user selecting the analysis condition after the analysis conditions of the assumed cell are registered in the device in advance. In this manner, it is possible to improve usability for the user. Alternatively, it is possible to adopt a structure in which the system is adjusted in advance and fixed to an arrangement which can obtain the incidence angle and the reflection angle suitable for conditions of a main analysis target sample. In this case, since the driving stage can be excluded, the structure is simplified. Therefore, since a usage method does not need a stage operation, a simple and easy usage method becomes available.

Preferably, the front side surface (upper side in FIG. 1) and the rear side surface (lower side in FIG. 1) of the substrate 133 are all flat and parallel to each other. In this case, angle $\theta_1$=angle $\theta_{1R}$=angle $\theta_2$ is satisfied, and these angles can be regarded as angles formed between a center line perpendicular to the front side surface of the substrate 133 and each light beam. Therefore, (although it is necessary to consider refraction when the light beam is incident on the prism), only the angle between each optical axis of the emission unit 102 and the detection unit 103 and the center line perpendicular to the front side surface of the substrate 133 can define the incidence angle (angle $\theta_1$=angle $\theta_{1R}$=angle $\theta_2$) used for the measurement. It is possible to use a mechanism or a control method in which the emission unit 102 and the detection unit 103 can always be located at positions which are mutually in line symmetrical with respect to the center line perpendicular to the front side surface of the substrate 133. In this case, the emission unit 102 and the detection unit 103 do not need to be separately operated or controlled. Therefore, the handling is facilitated.

FIG. 2 illustrates an enlarged view of a configuration around a measurement region 118. In the present embodiment, the measurement region 118 includes two partial measurement regions (118a and 118b). The excitation light 117 emitted from the rear side of the metal film 136 is reflected on the metal film 136. At this time, an extremely near region on the opposite side (upper side in FIG. 2) of the region of the metal film to which the excitation light 117 is emitted represents the respective partial measurement regions (118a and 118b). The respective partial measurement regions (118a and 118b) include sample regions 135a to 135d in which a substance serving as a sample can be present, and properties of each substance (refractive index or dielectric constant in SPR) affects the reflectance of the light. Accordingly, this reflectance from the intensity distribution of the reflected light 119 detected by the image sensor 116 is measured. In this manner, it is possible to measure the properties of the samples 135a to 135d present in the respective partial measurement region (118a and 118b). Here, each light beam of the excitation light 117 is reflected multiple times on the metal film in contact with a plurality of the partial measurement regions (118a and 118b). Therefore, although it seems that the reflectance corresponding to the respective samples 135a to 135d is less likely to be obtained from the intensity of the reflected light 119, obtaining the reflectance is achieved by a method described below.

FIG. 2a illustrates one (137) of the partial ray bundles configuring the light beam bundle of the excitation light 117. The light beam bundle 137 is reflected at reflectance $R_1$ on the portion of the metal film 136 in contact with one (135a) of the sample regions. Thereafter, the light beam bundle 137 is reflected at reflectance $R_2$ on the reflecting region 134 of the rear surface of the substrate, and is reflected at reflectance $R_3$ on the portion of the metal film 136 in contact with a dummy sample region 138 illustrated in the drawing. Here, for example, if the intensity of the partial light beam bundle 137 of the incident light 117 is set as $I_{in}$ and the intensity of the partial light beam bundle 137 in the reflected light 119 is set as $I_{ref}$, a relationship of the following expression is present between the observed total reflectance $I_{ref}/I_{in}$ and each reflectance.

$$I_{ref}/I_{in}=R_1 \times R_2 \times R_3 \qquad \text{Expression (1)}$$

However, $R_2$ is a constant (here, always 1 due to total reflection). Furthermore, if there is no change in the substance present in the dummy sample region 138, $R_3$ is a constant. Accordingly, the reflectance $R_1$ on the portion of the metal film 136 in contact with the sample region 135a is obtained by the following expression.

$$R_1=I_{ref}/I_{in}/(R_2 \times R_3)=I_{ref}/(I_{in} \times R_2 \times R_3) \qquad \text{Expression (2)}$$

That is, it is possible to obtain the required reflectance using Expression (2) by causing the known substance to always be present in the respective dummy sample regions 138a to 138d.

For example, before a measurement target sample is introduced into the sample region 135a, the measurement target sample is measured in a state of being introduced into the sample region 135a after the known sample (for example, water) is set as the reference sample in advance. In this case, if the intensity and distribution of the incident light 117 are not changed, the following expression is obtained.

$$R_{1'}=I_{ref'}/I_{in}/(R_2 \times R_{3'})=I_{ref'}/(I_{in} \times R_2 \times R_{3'}) \qquad \text{Expression (3)}$$

Based on Expression (2) and Expression (3), $$R_1/R_{1'}=\{I_{ref}/(I_{in} \times R_2 \times R_3)\}/\{I_{ref'}/(I_{in} \times R_2 \times R_{3'})\}=(I_{ref}/I_{ref'}) \times (I_{in'}/I_{in}) \times (R_2/R_2) \times (R_{3'}/R_3)=I_{ref}/I_{ref'} \qquad \text{Expression (4)}$$

Accordingly, a measurement value for the reference sample may be used so as to obtain a measurement ratio between the reference sample and the measurement target sample. In this way, extremely general correction may be performed. In this case, $R_2$ and $R_3$ may be known values or may be regarded as constants, and may not necessarily be reflectance 1 (that is, the total reflection).

Causing the known substance to be always present in the respective dummy sample regions 138a to 138d may be realized as follows, for example. The measurement regions 118a and 118b are divided into a plurality of channels or wells so as to allow different liquids to flow in the respective sample regions 135a to 135d and the dummy sample regions 138a to 138d. In this manner, the measurement is performed in a state where the dummy sample regions 138a to 138d are filled with a stable fluid such as water, air, and oil.

Alternatively, the substance present in advance may not be changed. Specifically, the configuration as illustrated in FIG. 3 may be adopted. A channel component 140 is provided with a plurality of channels 139a to 139d serving as a flow cell, and the sample 135a to 135d are arranged in each channel. However, in a location corresponding to the dummy sample regions 138a to 138d, a constant $R_3$ corresponding to a material of the channel component 140 is always obtained. Alternatively, any desired material different from that of other portions of the channel component 140 may be used for only the location corresponding to the dummy sample regions 138a to 138d of the channel component 140. In general, a material such as a resin which can be easily processed is used for the channel component 140. However, the location corresponding to the dummy sample regions 138a to 138d is caused to include the more stable resin, metal, or metal oxide. In this way, it is possible to perform a more stable measurement even if the location is repeatedly used.

FIGS. 2b and 2c illustrate another configuration for providing a reflecting region 134. In FIG. 2b, a member 141 for reflecting the light is disposed on the rear side of the substrate 133, and a dual-purpose prism 105c for incidence/reflection is used. Specifically, the reflecting region 134 may employ a dielectric material such as a resin or glass which has a lower refractive index than that of the material of the substrate and which totally reflects the light at the incidence angle. Alternatively, the reflecting region 134 may employ a metal body which can reflect the light. For example, a thin metal film such as aluminum may be subjected to vapor-deposition. In this case, the light is reflected at constant reflectance on a mirror surface of the thin metal film. According to a configuration using this reflecting member 141, only one prism 105c is sufficiently used. Accordingly, the number of components can be reduced. In FIG. 2c, a recess 142 is disposed on the surface of the prism 105c. In this manner, a space 143 into which index-matching oil 132 does not penetrate is generated between the prism 105c and the substrate 133. Air having a low refractive index is present in this space 143. Accordingly, the light is totally reflected on the reflecting region 134 on the rear surface of the substrate 133 which is in contact with the space 143. Here, the recess 142 may be replaced with a structure which prevents the index-matching oil 132 from coming into contact with the reflecting region 134. For example, the structure may be a member such as an O-ring serving as a barrier to prevent the index-matching oil 132 from flowing into the space 143, and a membrane structure or a microstructure disposed on the surface of the prism 105c which prevents the index-matching oil 132 from flowing into the space 143 by repelling the index-matching oil 132. According to any configuration illustrated in FIGS. 2b and 2c, the reflectance $R_2$ of the reflecting region 134 is constant in Expression (2) above. Accordingly, substantially the same discussion as above can be applied.

The intensity $I_{in}$ of the incident light 117 may be acquired by using various means. For example, $I_{in} \times R_3$ can be acquired by measuring the intensity of the reflected light 119 in a state where a uniform substance is introduced into the measurement region 118 in advance. Alternatively, the spatial distribution of $I_{in}$ can be acquired by measuring the intensity of the reflected light 119 in a state where the incident light is converted into S-polarized light by using a mechanism for switching the polarizing element 114.

As described above, a beam width D·cos θ of the incident light 117 projected onto the metal film 136, which is required for obtaining the arrangement of the incident light 117 and the respective sample regions 135a to 135d, is preferably smaller than a width (W in FIG. 2d) of the region covering all of the sample regions 135a to 135d. That is, D<W/cos θ may be satisfied. Even if this small width beam is used as the incident light 117, according to the above-described arrangement and procedure, it is possible to measure the reflectance from the intensity of the reflected light by emitting the light to all of the respective sample regions 135a to 135d. In this manner, the width of the beam required for the measurement can be reduced, and furthermore, an aperture of the optical element to be used can be reduced.

Here, the beam width of the incident light 117 indicates a cross-sectional width (D in FIG. 2d) of the beam of the incident light 117, mainly on a plane including the incident light 117 and the reflected light 119.

In addition, in this case, according to a preferred embodiment, the beam width of the incident light 117 is greater than the sum $\Sigma W_i$ of respective widths $W_1$ to $W_4$ of the sample regions simultaneously measured at one time, for example, the sample regions 135a to 135d in FIG. 2d, and may satisfy $D \geq (\Sigma W_i)/\cos θ$. In this manner, each reflectance can be simultaneously measured at the same time from the intensity of the reflected light by emitting the light to all of the sample regions 135a to 135d to be measured at the same time. In another example of a similar embodiment, the sample regions 135a and 135b are measured at a certain time, and the sample regions 135c and 135d are measured at another point in time, respectively at the same time. In this case, the projected beam width D·cos θ of the incident light 117 may be smaller than W, and may satisfy $W_1+W_2$ or greater or $W_3+W_4$ or greater. That is the beam width may satisfy D<W/cos θ, $D \geq (W_1+W_2)/\cos θ$, and $D \geq (W_1+W_2)/\cos θ$. In this example, an LED light source (wavelength 640 nm) is used as the light source 111. A quartz core fiber (core diameter 600 μm, NA 0.22) is used as the optical fiber 112. A spherical achromatic lens (outer diameter 50 mm, focal length 25 mm) is used as the collimating lens 113. A polarizing filter (adaptive wavelength 400 to 700 nm) is used as the polarizing element 114. An object-space telecentric lens (magnification 5 times) is used as the image forming lens 115. A half type of CMOS camera (number of effective pixels 1,280×1,024 (1.3 million pixels), pixel size 5.2 μm) is used as the image sensor 116. A spot diameter of the excitation light 117 after passing through the collimating lens 113 is φ10 mm. In the present embodiment, an LED having the wavelength of 640 nm is used as the light source 111. However, a device that oscillates electromagnetic waves having different wavelengths may be used. For example, a range of selectable wavelengths is 300 nm to 300 μm. In addition to LED, a solid laser, a gas laser, or a semiconductor laser can be used. In addition, a desired wavelength component may be extracted from one light source 111 oscillating a plurality of wavelengths by using a band pass filter. For example, the light source 111 is a xenon lamp. In the present embodiment, a commercially available polarizing filter is used as the polarizing element 114. However, for example, a component having similar functions such as a polarizing beam splitter or a Glan Thompson prism can be used.

In the present embodiment, the object-space telecentric lens is used as the image forming lens. However, a commercially available machine vision lens or a zoom lens can be used. Observation of low magnification to high magnification can be performed according to the application by exchanging the type of the image forming lens.

(Description of Structure of Liquid Feeding Unit)

Next, the liquid feeding unit 106 will be described. The liquid feeding unit 106 is configured to include reagent reservoirs 123 to 125, liquid feeding tubes 126 to 127, switching valves 128 to 129, a liquid feeding pump 130, and a waste liquid tank 131. The liquid feeding tubes are connected to the respective reagent reservoirs 123 to 125, and are integrated into the liquid feeding tube 126 via the switching valves 128 to 129. The liquid feeding tube 126 is connected to an opening portion (for introduction) of the flow cell 104. Another opening portion (for discharge) is disposed in the flow cell 104, and the other liquid feeding tube 127 is also connected thereto. A terminal end portion of the liquid feeding tube 127 is linked to the waste liquid tank 131. In addition, the liquid feeding pump 130 is attached to the liquid feeding tube 127, and the liquid moves from the reagent reservoirs 123 to 125 to the flow cell 104. A type, a feeding amount, a feeding speed and feeding timing of the reagent to be delivered from the reagent reservoirs 123 to 125 to the flow cell 104 are controlled in such a way that a liquid feeding system control unit 120 of the control PC 108 outputs an operation instruction to the switching valves 128 to 129 and the liquid feeding pump 130.

In the present embodiment, the reservoir 123 is filled with a measurement sample, the reservoir 124 is filled with a reaction reagent, and the reservoir 125 is filled with a buffer. In addition, in the present embodiment, TYGON R-3603 (inner diameter 0.8 mm, manufactured by Saint-Gobain) is used as the liquid feeding tubes 126 to 127, a three-way solenoid valve is used as the switching valves 128 to 129, and a peristaltic pump (maximum pressure 0.1 MPa) is used as the liquid feeding pump 130. The individual components are not limited thereto. For example, the number of components can be reduced by using a six-way switching valve as the switching valve. In addition, as the liquid feeding pump 130, another liquid feeding means such as a syringe pump can be selected.

(Description of Structure of Flow Cell)

FIG. 4 illustrates a configuration of a mechanism for holding the flow cell 104 and the prism 105c. The flow cell 104 includes a substrate 201 and a channel component 202. The flow cell 104 and the prism 105c are held by a holder 203. Similarly to a general SPR substrate, the substrate 201 is manufactured by forming a thin gold film on an observation surface (front surface, upper side in FIG. 4) for fixing the measurement sample of a glass substrate. In the channel component 202, a groove 204 serving as a channel pattern is formed on the surface. This structure functions as the flow cell 104 by bringing the thin gold film surface of the substrate 201 and the groove side flat surface of the channel component 202 into close contact with each other. The holder 203 is provided with opening portions 209 to 210 for allowing the liquid feeding tubes 126 to 127 to pass therethrough. The liquid feeding tubes 126 to 127 pass through the opening portions 209 to 210 of the holder, and are respectively connected to opening portions 207 to 208 on the channel component 202. In addition, the holder 203 is provided with an opening portion 212 for allowing a temperature-controlled $CO_2$ gas pipe 211 to pass therethrough. PDMS used as the channel component 202 has a high gas exchange function, and can maintain the temperature and $CO_2$ concentration to be constant on the surface of the substrate 201. In the present embodiment, the temperature is adjusted to 37° C., and the $CO_2$ concentration is adjusted to 5% so that cells are most active. A linear guide for moving a field of view and for adjusting focus is attached to the holder 203. However, the linear guide is omitted in FIG. 1.

A material of the substrate 201 used in the present embodiment is S-LAL10 manufactured by Ohara Inc., a shape thereof is a plate shape being 20×20 mm in length and width and 1.0 mm in thickness. The thickness of the thin gold film formed on the surface is 50 nm. Chromium having a thickness of 1 nm is present as an adhesive layer between the glass substrate and the thin gold film. A material of the channel component 202 used in the present embodiment is polydimethylsiloxane (PDMS), and a shape thereof is a plate shape being 18 mm in length and width and 5 mm in thickness. A size of the groove 204 is 2 mm in width, 1 mm in depth, and 10 mm in length. Vertical channels 205 and 206 extending from both ends of the groove 204 to a surface opposite to the groove 204 are present, and opening portions 207 and 208 are respectively disposed in each terminal. In addition, a material of the prism 105c used in the present embodiment is S-LAL10 manufactured by Ohara Inc., which is the same as that of the substrate 201, and a shape thereof is a triangular prism shape having a height of 20 mm with an equilateral triangle having a side of 20 mm as a bottom surface. The substrate 201 and the side surface (square surface) of the prism 105c are optically in contact with each other by using the index-matching oil (not illustrated). In the present embodiment, Cargill standard refractive liquid (refractive index 1.72) is used as the index-matching oil.

The surface of the substrate 201 may be subjected to treatment for promoting fixation of the measurement sample. For example, the surface may be subjected to treatment using Poly L-lysine or various antibodies corresponding to the measurement sample. In addition, it is possible to easily hold the measurement sample by disposing minute irregularities on the surface of the substrate 201.

In the present embodiment, the PDMS channel 202 is adhered to the substrate 201. However, for example, a structure may be adopted in which those having a channel pattern formed on a thin sheet-like PDMS are interposed between members such as the substrate 201 and cover glass.

The plurality of grooves 204 may be disposed in the flow cell 104. There are no limitations on the number and width of the grooves 204, or the interval between the grooves 204. However, it is desirable that the measurement region 118 partially or entirely covers the plurality of grooves 204, and that the grooves 204 are in a separable condition on the image sensor 116 so as to form an image.

In the present embodiment, S-LAL10 is used as the material of the prism 105c and the substrate 201. However, any material may be used as long as the material is optically transparent. For example, glass, sapphire, quartz, or acrylic resin can be used. In addition, it is desirable that the materials of the prism 105c and the substrate 201 are the same material in order to prevent reflection on the interface when the light moves between the two of these. However, if the condition shows that the light is not totally reflected on the interface, different materials may be used in combination. The shape of the prism 105c is not limited to the triangular prism, and may be another shape such as a trapezoidal shape and a rectangular shape. For example, if the semicircular columnar prism is used, the excitation light 117 is always incident perpendicularly to the prism 105c, irrespective of the incidence angle. Therefore, loss caused by the reflection can be minimized.

In the present embodiment, the substrate 201 having a thin gold film formed thereon is used. However, the thin gold film may be directly formed on the surface of the prism 105c so as to perform analysis there. The substrate 201 and the prism 105c are integrated with each other. In this manner, the reflection loss of the light can be reduced on the interface between the two of these. In addition, the number of components is reduced and the index-matching oil is unnecessary. Therefore, the operability is improved.

In the present embodiment, the temperature of the surface of the substrate 201 is controlled by introducing hot air into the holder 203. However, the temperature of the device 101 may be entirely adjusted. In addition, for example, a temperature control component such as a Peltier element may be directly or indirectly brought into contact with the side face of the prism $105c$. Alternatively, a thin conductive film of ITO may be formed on the side of the prism $105c$ so as to adjust the temperature by supplying electricity thereto.

In the present embodiment, the CO2 concentration inside the holder 203 is controlled. However, the CO2 concentration of the device 101 may be entirely controlled.

(Flowchart of Device Operation)

A series of observation processes according to the present example will be described using an example of measuring a response function of RBL-2H3 cells which are cell lines derived from rat basophils with respect to the stimulus of DNP-HSA antigen (Sigma-Aldrich Co. LLC.).

RBL-2H3 cells are activated in such a way that IgE receptors on the surface bind to the antigen via receptor-bound IgE. Then, granules containing intracellular histamine or protease are released (degranulation). This results in the fact that this process plays an important role in causing type I allergy to appear. This response phenomenon of RBL-2H3 cells to the antigen stimulus is widely used as an evaluation method of allergic reactions. For example, it is possible to evaluate the antigenicity of the substance (whether or not an allergic reaction is caused) by using the substances (pollen or house dust) in foods, drugs, or environment as the antigen (reaction reagent). Alternatively, the additional antiallergic effect of the substance in addition to the antigen may be evaluated. That is, a combination of the cells and the antigens which are already known to be responsive, for example, RBL-2H3 cells sensitized with an anti-DNP-IgE antibody (as described below), and DNP-HSA antigen are used. Thereafter, a substance to be tested may be further added thereto so as to measure whether or not the response is suppressed or enhanced.

FIG. 5 is a flowchart of observation according to the invention. Hereinafter, a cell function observation method according to the invention will be described with reference to FIGS. 1 to 6.

Before the process starts, the measurement sample and the reaction reagent are prepared. First, RBL-2H3 cells are cultured (5% CO2, 37° C.) in a Roswell Park Memorial Institute (RPMI) medium supplemented with 10% of fetal bovine serum (FCS), 100 unit/mL of penicillin, and 100 μg/mL of streptomycin. Next, the cells are cultured for 24 hours (5% CO2, 37° C.) using a culture solution supplemented with 50 ng/mL of mouse monoclonal anti-DNP-IgE antibody (Sigma Aldrich Co. LLC.) in a cell culture dish (HydroCell, CellSeed INC.). In this manner, the cells are sensitized. Thereafter, the sensitized cells are suspended in Siraganian buffer (119 mM NaCl, 5 mM KCl, 0.4 mM MgCl, 25 mM piperazine-N, N'-bis (2-ethanesulfonic acid) (PIPES), 40 mM NaOH, pH 7.2) so as to obtain a concentration of $1 \times 10^6$/mL, and the measurement sample are prepared for the measurement. Pre-warming (5% CO2, 37° C.) for 10 minutes is applied before the measurement sample is set in the device. As the reaction reagent, 50 ng/mL of DNP-HSA antimicrobial solution is used. As the buffer, Siraganian buffer is used.

Various reagents adjusted by the above-described procedure and the flow cell 104 are set in the device 101. The inside of the substrate holder 203 is controlled in advance so as to have the temperature of 37° C. and the CO2 concentration of 5%.

In Process P1, the incidence angle is adjusted. The liquid feeding system control unit 120 operates the pump 130 and the valves 128 to 129 so as to deliver the buffer to the flow cell 104. Thereafter, the pump 130 is stopped, and the inside of the flow cell 104 is filled with the buffer. In the present embodiment, liquid feeding is performed at a liquid feeding rate of 500 μL and liquid feeding speed of 1.6 μL/second (100 μL/min). After the flow cell 104 is filled with the buffer, the optical system control unit 122 operates the emission unit 102 and the detection unit 103 so as to perform SPR observation while continuously changing the incidence angle of the excitation light 117. In the present embodiment, images are acquired while the range of the incidence angle 45° to 70° is continuously changed at intervals of 0.5°. The exposure time of the image sensor 116 is set to 0.1 seconds. The image data is sequentially transmitted to the control PC 108, and the analyzing unit 121 analyzes the signal intensity of the reflected light 119 from the sent image. In the present embodiment, as the intensity of the reflected light 119, a value obtained by averaging the sum of the signal intensities in the regions where the buffers are present in terms of the number of pixels is used. The analyzing unit 121 prepares a plot in which the incidence angle of the excitation light 117 is set as the X-axis and the signal intensity of the reflected light 119 is set as the Y-axis. In this manner, a point indicating the minimum value is set as the incidence angle in the response observation (to be described later). In the present example, the incidence angle is set to 57.5°.

In Process P2, a target value of the cell fixation amount at the time of observation is set. The target value of the cell fixation amount is directly input by an operator. Alternatively, the target value is automatically set by the operator selecting the condition (for example, "high magnification observation") previously recorded in the device 101.

When the cells are observed on one unit basis, it is desirable that the cells are present to some degree in the observation field of view and that the cells are fixed without overlapping each other. In the present embodiment, average cell density is employed as an indicator of the cell fixation amount. Hereinafter, a calculation method for setting the target value of the average cell density will be described.

If it is assumed that the cells are randomly fixed on the substrate, in a case of average cell density δ, a probability B(x) that the x-number of cells may be present in a range of an areas can be expressed by Expression (5) below in accordance with the Poisson distribution.

[Numerical Formula 1]

$$B(x)=(s\delta)x/x!\exp(-s\delta) \qquad \text{Expression (5)}$$

The area s represents a range of a radius r whose center is a certain cell ($s=\pi r^2$). A probability B(0) that no other cell is present within this range can be expressed by Expression (6) below.

[Numerical Formula 2]

$$B(0)=\exp(-s\delta)=\exp(-\pi r^{2}\delta) \qquad \text{Expression (6)}$$

In a case where the cells are circular, if it is assumed that the area s is the area of the cells, B(0) represents a "probability that cells may be present without overlapping each other". In this case, r is equal to the center-to-center distance (cell diameter) of the respective cells when two cells are in contact with each other. A relationship between the average cell density δ and B(0) is expressed by Expression (7) below.

[Numerical Formula 3]

$$\delta=-\{\log B(0)\}/(\pi r2) \qquad \text{Expression (7)}$$

For example, the average cell density δ which satisfies the condition that 50% or more of cells are present without overlapping each other can be obtained by using the cell having the diameter of 10 μm and by solving Expression (7) for δ (Expression (8)).

[Numerical Formula 4]

$$\delta \leq -\{\log 0.5\}/(\pi r^2) \leq 2{,}206/\text{mm}^2 \qquad \text{Expression (8)}$$

The target value of the average cell density is set to 2,206 cells/mm² or smaller. In this manner, the number of the cells which do not overlap each other becomes a majority in the field of view. That is, it is possible to reduce the work load for selecting the cells which do not overlap each other, thereby improving the analysis efficiency. Preferably, the average cell density δ is 335 cells/mm² or smaller. This case satisfies the condition that 90% of the cells are present without overlapping each other. More preferably, the average cell density δ is 163 cells/mm². This case satisfies the condition that 95% of the cells are present without overlapping each other. In the above-described conditions, the number of the cells that do not overlap each other in the field of view is respectively 427 and 219.

On the other hand, if the target value of the average cell density is set to 335 cells/mm² or more, a proportion of the cells overlapping each other exceeds 10%. Accordingly, although it takes time to screen the cells which do not overlap each other, it is possible to observe much more cells. That is, it is possible to obtain analysis results with less variation by increasing the absolute number of the cells to be observed. The average cell density is preferably 1,135 cells/mm² or more, and the cells which do not overlap each other in the visual field are 1,126 cells. The average cell density is more preferably 2,206 cells/mm² or more, and the number of the cells which do not overlap each other in the visual field is 1,563. If the average cell density exceeds 3,182 cells/mm², the number of the overlapping cells in the visual field decreases, and the overlapping cells accounts for the majority. Therefore, in an application for mainly observing the overlapping cells, it is preferable that the average cell density is 3,182 cells/mm² or more.

According to the above-described calculation method, the operator can set the optimum average cell density depending on the observation application. For example, the operator may input a proportion (for example, 90%) of desired cells which do not overlap each other from a text box, and may calculate the suitable average cell density from this proportion so that the suitable average cell density is set as the target value. In the present example, as the condition that a sufficient number of cells is present in the field of view and most of the cells do not overlap each other, the set value of the average cell density is set to 100 cells/mm².

In Process P3, the cells are fixed onto the surface of the substrate 201. The liquid feeding system control unit 120 operates the pump 130 and the valves 128 to 129 so as to deliver the measurement sample to the flow cell 104. Thereafter, the pump 130 is stopped, and the inside of the flow cell 104 is filled with the measurement sample. In the present embodiment, liquid feeding is performed at the liquid feeding rate of 500 μL and liquid feeding speed of 1.6 μL/second (100 μL/min).

In Process P4, the number of the cells adhering to the surface of the substrate 201 is monitored. The optical system control unit 122 operates the emission unit 102 and the detection unit 103 so as to acquire an image after a prescribed time elapses from the start of this process, and transmits image data to the control PC 108. In the present embodiment, the image is set so as to be acquired 10 minutes after the start of the process. The analyzing unit 121 analyzes the image, and calculates the fixation amount of the cells at that time.

In the present embodiment, first, the image data in a region where the measurement sample is present is extracted, and the extracted image is binarized so as to obtain the number of cells by performing particle number analysis. An area is obtained from the number of pixels of the extracted image data, and the cell density is calculated in such a way that the number of cells is divided by the area. In addition to this method, the calculation can be performed by various methods such as a calculation method from the area (the number of pixels excluding the background is counted, and is divided by the number of pixels corresponding to one previously obtained cell so as to obtain the number of cells). Only the number of cells may be used as the fixation amount without calculating the density. In addition, as an index of the fixation amount, an intercellular distance may be used. For example, the intercellular distance, for example, a center-to-center distance or a distance between contours of the cells may be calculated from the acquired image. In this manner, the maximum value, the minimum value, the average value, or the median value of all intercellular distances is used as the index of the fixation amount so as to control the fixation amount.

In Process P5, the cell fixation amount is determined. The analyzing unit 121 compares the fixation amount calculated in Process P4 with the target value set in Process P2. In accordance with the comparison result, the analyzing unit 121 instructs any one of the liquid feeding system control unit 120 and the optical system control unit 122, or both of these. As a method of comparing the fixation amount and the target value with each other, a method may be used which determines a size of the value, whether or not a difference between both of these is greater than a reference value, whether a ratio of both of these is greater than the reference value. Alternatively, not only the fixation amount at one point at that time but also a time-dependent change may be used. For example, a differentiation value at a certain time point, an average increase/decrease amount or an increase/decrease rate during a certain time period, an accumulated value, or an integrated value may be used. Parameters such as the reference value when used for comparison may be set in advance when the device is manufactured, adjusted, or set. Concurrently during the analysis flow, for example, when the target value of the fixation amount is set in Process P2, the parameters may be input by an operator through GUI or a command line, or may be read from a setting file. The analyzing unit 121 uses these comparison methods so as to determine whether it is still necessary to adjust the fixation amount or since it is unnecessary to adjust the fixation amount, the analyzing unit 121 determines whether to subsequently proceed to Process P6.

For example, in a case where the fixation amount does not reach the target value set in Process P2, it is necessary to adjust the fixation amount. Accordingly, the analyzing unit 121 instructs any one or both of the liquid feeding system control unit 120 and the optical system control unit 122 to perform the necessary process, and proceeds to Process P4 again. For example, as the content of the instruction, an instruction to wait for a prescribed period of time may be given so as to promote fixation reaction. In addition, an instruction to change conditions for promoting the fixation reaction, temperature, liquid agitation, flow rate, and other physical conditions may be given. Alternatively, the process may proceed to the fixation reaction in Process P3. Alternatively, these instructions may be combined with each other, or any instruction may be appropriately selected therefrom.

For example, in a case where the fixation amount reaches the target value set in Process P2, it is unnecessary to adjust the fixation amount. Accordingly, although the process proceeds to Process 6, a process for stopping the fixation reaction is performed if necessary. Specifically, the liquid feeding system control unit 120 operates the pump 130 and the valves 128 to 129 so as to deliver a buffer to the flow cell 104, and replaces the measurement sample inside the flow cell 104 with the buffer. In the present embodiment, liquid feeding is performed at a liquid feeding rate of 500 µL and 1.6 µL/second (100 µL/min). The process for stopping the fixation reaction is not limited to this method, and various methods can be used. A drug for inhibiting or stopping the fixation reaction may be added thereto. Other physical conditions such as temperature and pH may be changed.

In Process P6, response observation is performed. The optical system control unit 122 operates the emission unit 102 and the detection unit 103 so as to continuously acquire images at a prescribed time interval (time lapse imaging). In the present embodiment, an exposure time is set to 0.1 seconds, and an imaging interval is set to 10 seconds. The captured image data is sequentially transmitted to the control PC 108, and the analyzing unit 121 analyzes the signal intensity of the reflected light 119 from the transmitted image. In the present embodiment, analysis is performed in such a way that the value obtained by averaging the signal intensities of all pixels in the region where the buffer is present is used as the signal intensity of the reflected light 119. However, for example, all pixels in all regions including the channel component may be calculated. In addition, the analysis may be performed by limiting to one or more optional regions. The analyzing unit 121 prepares a plot in which the elapsed time is set as the X-axis and the signal intensity of the reflected light is set as the Y-axis, and displays the plot on the monitor 109 on a real time basis.

After a prescribed time elapses from the time lapse imaging, the reaction reagent containing the stimulus substance is brought into contact with the cells. The liquid feeding system control unit 120 operates the pump 130 and the valves 128 to 129 so as to feed the reaction reagent to the flow cell 104. Thereafter, the pump 130 is stopped, and the inside of the flow cell 104 is filled with the reaction reagent. In the present embodiment, after 60 seconds elapse from the start, the reaction reagent is fed at a liquid feeding rate of 500 µL and liquid feeding speed of 1.6 µL/second (100 µL/min).

After a prescribed time elapses from filling of the reaction reagent, the time lapse imaging is completed. The optical system control unit 122 operates the emission unit 102 and the detection unit 103 so as to stop the operation of the emission unit 102 and the detection unit 103, and notifies an operator by causing the monitor 109 to display that the measurement is completed. In the present embodiment, the time lapse imaging is completed after 1,800 seconds elapse from the filling of the reaction reagent.

Finally, the liquid feeding system control unit 120 operates the pump 130 and the valves 128 to 129 so as to deliver a buffer to the flow cell 104. After the liquid feeding tubes 126 to 127 and the flow cell 104 are internally cleaned by the buffer, the pump 130 is stopped. In the present embodiment, liquid feeding is performed at a liquid feeding rate of 4,000 µL and liquid feeding speed of 3.2 µL/second (200 µL/min). A solution containing trypsin may be fed before the cleaning by using the buffer. The process is added, thereby removing the cells adhering to the surface of the substrate 201. The surface of the substrate 201 returns to a state before the measurement. Accordingly, it is possible to repeatedly perform the measurement without replacing the substrate 201.

Determining a timeout error may be included during or before or after Process P5. For example, the determination timing may be before or after the comparison between the fixation amount and the target value. Alternatively, the determination timing may be set before or after the process for adjusting the fixation reaction is instructed to any one or both of the liquid feeding system control unit 120 and the optical system control unit 122, or before or after the process for stopping the fixation reaction to any one or both of the liquid feeding system control unit 120 and the optical system control unit 122. Determination criteria of the timeout error may be based on a case where the timing exceeds a predetermined time or a case where the timing exceeds a predetermined frequency. Here, as the frequency, a frequency of comparison between the fixation amount and the target value, calculation of the fixation amount, execution or instruction of the fixation amount adjustment may be used. As the time, a starting time of the fixation reaction of the measurement sample or the elapsed time calculated from device preparation, setting, or preparation of the measurement sample, the reaction reagent may be used. In addition, a plurality of the determination criteria described here may be combined with each other. In addition, an operator may employ any one of the determination criteria or may select whether or not to determine. In addition, the selection timing may be before the analysis flow starts or after the analysis flow starts (before the analysis flow ends). As an operation after it is determined as the timeout error, a process may be performed such as temporarily stopping or stopping the analysis flow, adjusting the special fixation amount for the timeout error, and forcedly proceeding to Process P6. The analyzing unit 121 appropriately instructs any one or both of the liquid feeding system control unit 120 and the optical system control unit 122 with regard to the required operation content. For example, in a case where the analyzing flow is temporarily stopped, the analyzing unit 121 may notify the operator via the monitor 108 or a voice of that effect, may prompt the operator to instruct the next operation, and may provide instruction means via a GUI, CUI, gesture, or voice. Operational options may include restarting the flow, stopping the flow, the special fixation amount adjustment for the timeout error, and forcedly proceeding to process P6. In a case where the operator selects restarting the flow, the device 101 may be provided with specifications which can change the measurement sample, the reaction reagent, various setting values, and device settings before restarting the flow. When stopping the flow is selected, if necessary, the analyzing unit 121 may instruct any one or both of the liquid feeding system control unit 120 and the optical system control unit 122 so as to complete the process.

Setting the target value in Process P2 may be performed before Process P5. Setting the target value in Process P2 is preferably before starting the fixation reaction in Process P3 after preparing the device in Process P1. In this case, for example, the measurement sample, the reaction reagent, and devices are first prepared when the test starts. Thereafter, the target value of a certain fixation amount which is a test condition is set. The result obtained by performing the analysis is additionally considered. Based on the consideration, as a new test condition, the target value of the fixation amount is corrected and analyzed. According to this method of carrying out the test, it is not necessary to revise the device preparation. Accordingly, the test can be efficiently carried out. Alternatively, setting the target value in Process P2 may be performed before preparing the device in Process P1. In this case, the target value of a certain fixation amount is set. Thereafter, the device preparation is done, the setting is changed, based on the result obtained by performing the analysis, or various reagents are exchanged or prepared again so as to restart the analysis. In this test, it is not necessary to revise the target value settings. Accordingly, the test can be efficiently carried out. This case includes a case where the measurement sample and the reaction reagent are not supposed to be prepared based on the test result, a case where a gap (error) between the fixation amount actually obtained and the target value is greater than expected, a case where the target fixation amount cannot be obtained due to the timeout error, and a case where it is recognized that the measurement sample and the analysis result are adversely affected since the time to reach the desired fixation amount is excessively lengthened than expected.

FIG. 6 illustrates the result of the antigen response reaction of RBL-2H3 cells measured using the above-described means. The reaction reagent starts to be fed after 60 seconds from the measurement start. After approximately 50 seconds therefrom, it is possible to confirm an increase in the intensity of the SPR reflected light which results from the response of the cells.

Embodiment 2

FIG. 7 illustrates an example in which a pipetter mechanism 504 is used for the liquid feeding unit 106 and a well substrate 601 is used instead of the flow cell 104. The other configurations are the same as those of Embodiment 1. Here, the pipetter mechanism can discharge the liquid as much as a designated volume. The present embodiment may employ a method of discharging the liquid aspirated from a separate liquid reservoir before the liquid is discharged or a method of intermittently discharging the liquid, if necessary, by filling a reservoir directly connected to the pipetter mechanism with liquid in advance.

(Description of Structure)

The liquid feeding unit 106 according to the present embodiment includes reagent reservoirs 501 to 503 and the pipetter mechanism 504. The pipetter mechanism 504 includes a nozzle 505, a robot arm 506, a pipe 507, a syringe pump 508, a liquid feeding pump 509, a switching valve 510, a water tank 511, a cleaning tank 512, and a waste liquid tank 513.

The nozzle 505 is held by the robot arm 506, and can be moved to the well substrate 601, the reagent reservoirs 501 to 503, the cleaning tank 512, and the waste liquid tank 513, if necessary. The nozzle 505 is connected to the syringe pump 508 via the pipe 507, and can aspirate or discharge a designated volume of the liquid from the reagent reservoirs 501 to 503 and the well substrate 601. Unnecessary liquid aspirated from the reagent reservoirs 501 to 503 and the well substrate 601 is discharged to the waste liquid tank 503. The liquid feeding pump 509 is connected to the syringe pump 508, and the syringe pump 508 can be filled with the water of the water tank 511. In addition, the nozzle 505 is moved to the waste liquid tank 513, and the water is discharged from the liquid feeding pump 509 through the syringe pump 508 and the nozzle 505, thereby cleaning the inside of the channel and the inside of the nozzle 505. In this manner, it is possible to prevent and reduce contamination and carryover of the liquid to be aspirated and discharged. Furthermore, the nozzle 505 is moved to the cleaning tank 512, and the switching valve 510 is switched, the water is discharged to the cleaning tank 510, and the water is sprayed to the nozzle 505, thereby enabling the outside of the nozzle 505 to be cleaned. Similarly, it is possible to prevent and reduce contamination and carryover of the liquid to be aspirated and discharged. These operations are performed by transmitting an operation instruction to the robot arm 506, the syringe pump 508, the liquid feeding pump 509, and the switching valve 510 from the liquid feeding system control unit (omitted in this drawing).

FIG. 8 illustrates a configuration diagram of the well substrate 601. The well substrate 601 is configured to include a well component 602, a substrate 201, a prism 105c, and a holder 603 for integrally holding all of these. The substrate 201 and the prism 105c can employ basically the same configurations as those according to Embodiment 1. The well component 602 includes one or more liquid holding sites 604. The well component 602 is set on the substrate 601, thereby forming one or more wells 605 between the liquid holding site 604 and the substrate 201. An opening portion 606 for allowing the nozzle 505 to pass therethrough is disposed in the holder 603. The opening portion 606 has a septa 607 disposed therein. The nozzle 505 penetrates the septa 607 of the opening portion 606, and reaches the well 605 on the well substrate 601. In addition, an opening portion 608 for allowing a temperature-controlled CO2 gas pipe 211 pass through is disposed in the holder 603. In this manner, it is possible to maintain the temperature and CO2 concentration to be constant on the surface of the well substrate 601. In the present embodiment, the temperature is adjusted to 37° C., and the CO2 concentration is adjusted to 5% so that the cells are most active. A linear guide for moving a field of view and for adjusting the focus is attached to the holder 603. However, the linear guide is omitted in FIG. 8.

In a case where a plurality of wells 605 are present in one well substrate 601, there is an advantageous effect that interaction analysis is available under a plurality of conditions by setting up the well substrates 601 at once. Particularly, in a case where an optical system including the emission unit 102 and the detection unit 103 enables the plurality of wells 605 to be concurrently observed during all hours or on a temporary basis, the plurality of conditions can be concurrently analyzed. The respective wells 605 hold the liquid in the wells or on the wells, and have a function to prevent unintentional mixing or movement of the liquid between the wells 605. In addition, the respective wells 605 have at least one opening portion which can introduce the liquid to be held. As the well component 602, various structures having this function may be used. The amount of liquid which can be held in each well 605 can be appropriately changed depending on the application. However, the amount is preferably 1 nL to 1 mL, more preferably 10 nL to 100 μL, and much more preferably 100 nL to 10 μL.

As another form of the well component 602, the following members can be used. The members include a plate-shaped member having the thickness with a through-hole as the liquid holding site 604, a member having a wall surface surrounding the liquid as the liquid holding site 604 (for example, which digs a bottom surface of the multi-well plate), a sheet-like member having a through-hole as the liquid holding site 604 in a sheet-like member showing water repellency against the holding liquid, or a member having a pattern functioning as the liquid holding site 604 through surface treatment showing water repellency or hydrophilicity against the holding liquid which is subjected to the surface of the substrate 201 (and arrangements of functional groups or molecules/atoms introduced to the surface through the treatment). For example, as the pattern, it is possible to use a pattern in which a portion other than the respective liquid holding sites 604 is subjected to water repellent surface treatment and the inside of the respective liquid holding sites 604 is unprocessed, or a pattern in which only the outer periphery of the respective liquid holding sites 604 is subjected to hydrophilic surface treatment on the surface of the substrate 201 which is relatively water repellent. As another example of the well component 602, a member having the flow cell shape and having an opening portion at the end or in the middle of the channel may be used. In this case, the liquid may be introduced by dropping the liquid into the opening portion or by inserting the nozzle 505 into the opening portion. The liquid in the respective wells 605 is half trapped inside the well component 602, and the surface area which is directly in contact with the atmosphere becomes smaller. Accordingly, there is an advantageous effect in that the liquid is less likely to evaporate and more accurate analysis is likely to be achieved.

In a case where the pipetter mechanism 504 as described above is used, a portion with which both different measurement samples and reaction reagents are in contact is only the nozzle 505 or the pipe 504 in the vicinity of the nozzle 505. Accordingly, there is an advantageous effect in that the carryover is prevented or reduced.

In addition, various methods described in Embodiment 1 can be used for the material and the structure of the prism 105c and the substrate 201, or the method of controlling the temperature and the $CO_2$ concentration.

(Outline of Operation)

An actual analysis example when a combination of the pipetter mechanism. 504 and the well substrate 601 is used will be described. Here, the analysis target is the same as that in Embodiment 1. The RBL-2H3 cells which are cell lines derived from rat basophils are used as the measurement sample, and the DNP-HSA antigen (Sigma-Aldrich Co. LLC.) is used as the reaction reagent so as to measure the response function of the cells with respect to the antigen stimulus. The reagent reservoir 501 is filled with the measurement sample, the reagent reservoir 502 is filled with the reaction reagent, and the reagent reservoir 503 is filled with the buffer, respectively. As the well component 602, a component in which a plate-like PDMS (19×19 mm in length and width, 5 mm in thickness) has an open throughhole (φ 4 mm) is used. The component is held by the holder 603 so as to be in close contact with the upper surface (surface having the thin gold film) of the substrate 201 in which the thin gold film is disposed similarly to Embodiment 1.

A flowchart of the basic operation can employ the same flowchart described in Embodiment 1. Accordingly, only elements different from those according to Embodiment 1 will be described herein with reference to FIG. 5. In addition, all operations are performed in accordance with the instructions of the liquid feeding system control unit 120 and the optical system control unit 122 inside the control PC 108 described in Embodiment 1.

In Process P1, the well 605 is filled with the buffer, and the incidence angle is adjusted. The nozzle 505 is moved to the reagent reservoir 503, and the buffer is aspirated. Thereafter, the nozzle 505 is moved to the well substrate 601, and the buffer is discharged to the well 605. The liquid amount of the buffer used in this process is 10 μL. After the buffer is discharged, the nozzle 505 is moved to the waste liquid tank 513, and is internally cleaned by discharging a small amount of water. Thereafter, the nozzle 505 is moved to the cleaning tank 512, and is externally cleaned. After the above-described operations are completed, the incidence angle is adjusted by the method described in Embodiment 1. In a case where the plurality of wells 605 are present in the well substrate 601, the incidence angle can be adjusted by filling only a specific region with the buffer and by measuring the intensity of the SPR reflected light in that region. After the incidence angle is completely adjusted, the nozzle 505 is moved to the well substrate 601, the buffer is aspirated, and the buffer is discharged to the waste liquid tank 513. Thereafter, the cleaning operation is performed in the same procedure as described above.

In Process P3, the fixation reaction of the measurement sample is performed. The reaction is performed by discharging the measurement sample to the well 605 in the same procedure as in Process P1 and by waiting for the result as it is. The liquid amount of the measurement sample used in this process is 10 μL. During the wait, the cells sink to the bottom of the well 605 due to gravity. The thin gold film is exposed in the bottom of the well, and the cell adheres to the surface of the thin gold film due to the cell's inherent properties. Alternatively, the measurement sample may be aspirated and discharged to the well 605. Thereafter, another drug which initiates or promotes the fixation reaction may be aspirated from another reservoir (not illustrated), and may be discharged after being added to the same well 605.

When the fixation amount is determined in Process P5, in a case where the fixation amount is smaller than the target value, the measurement sample of 5 μL is aspirated from the well 605, and is discarded to the waste liquid tank 513. Thereafter, the measurement sample of 5 μL is aspirated from the reagent reservoir 501, and is discharged to the well 605.

In a case where the fixation amount is equal to or greater than the target value, the measurement sample of 5 μL is first aspirated from the well 605, and is discarded to the waste liquid tank 513. The buffer of 10 μL is aspirated from the reagent reservoir 503, and discharged to the well 605. The buffer of 10 μL is aspirated from the well 605, and is discarded to the waste liquid tank 513. This operation is repeated 5 times, unfixed cells are removed from the solution in the well 605, and the fixation reaction is stopped. Even if the number of repetition frequencies of this operation is determined in advance, the progress of the fixation reaction is further monitored by using the optical system control unit 122 and the analyzing unit 121. In this manner, the process may be continued until it is confirmed that the fixation reaction is stopped. In addition, even in this case, a condition for stopping the repeated operation may be provided by setting the timeout or the upper limit frequency.

In Process P6, the response observation is performed. The procedure of the response observation is as described in Embodiment 1. As a method of adding the reaction reagent to the measurement sample, the reaction sample is first aspirated in the same procedure as in Process P1, the measurement sample is fixed, and the measurement sample is added to the well 605 filled with buffer.

The liquid amount of the reaction reagent used in this process is 10 μL. After the reaction reagent is added, mixing of the reaction reagent may be promoted by performing the pipetting operation using the nozzle 505. Alternatively, after the buffer inside the well 605 is discarded using the nozzle 505, the reaction reagent may be added thereto.

REFERENCE SIGNS LIST

101 ANALYZING DEVICE
102 EMISSION UNIT

103 DETECTION UNIT
104 FLOW CELL
105a INCIDENT LIGHT PRISM
105b REFLECTED LIGHT PRISM
105c DUAL-PURPOSE PRISM FOR INCIDENT/REFLECTED LIGHT
106 LIQUID FEEDING UNIT
107 TEMPERATURE REGULATING DEVICE
108 CONTROL PC
109 MONITOR
110 CO2 GAS CYLINDER
111 LIGHT SOURCE
112 OPTICAL FIBER
113 COLLIMATING LENS
114 POLARIZING ELEMENT
115 IMAGE FORMING LENS
116 IMAGE SENSOR
117 EXCITATION LIGHT
118 MEASUREMENT REGION
118a, 118b MEASUREMENT REGION (PORTION)
119 REFLECTED LIGHT
120 LIQUID FEEDING CONTROL UNIT
121 ANALYZING UNIT
122 OPTICAL SYSTEM CONTROL UNIT
123 REAGENT RESERVOIR
124 REAGENT RESERVOIR
125 REAGENT RESERVOIR
126 LIQUID FEEDING TUBE
127 LIQUID FEEDING TUBE
128 SWITCHING VALVE
129 SWITCHING VALVE
130 LIQUID FEEDING PUMP
131 WASTE LIQUID TANK
132 INDEX-MATCHING OIL
133 SPR SUBSTRATE
134 REFLECTING REGION ON A SUBSTRATE REAR SURFACE
135a to 135d INDIVIDUAL SAMPLE REGION
136 METAL FILM
137 PARTIAL LIGHT BEAM BUNDLE
138a to 138d DUMMY SAMPLE REGION
139a to 139d EACH CHANNEL OF FLOW CELL
140 CHANNEL COMPONENT
141 REFLECTIVE FILM
142 RECESS
143 AIR LAYER
201 SUBSTRATE
202 CHANNEL COMPONENT
203 HOLDER
204 GROOVE
205 VERTICAL CHANNEL
206 VERTICAL CHANNEL
207 OPENING PORTION
208 OPENING PORTION
209 OPENING PORTION
210 OPENING PORTION
211 CO2 GAS PIPE
212 OPENING PORTION
P1 DEVICE PREPARATION
P2 TARGET VALUE SETTING OF FIXATION AMOUNT
P3 FIXATION RESPONSE OF A MEASUREMENT SAMPLE
P4 FIXATION AMOUNT MEASUREMENT
P5 FIXATION AMOUNT DETERMINATION
P6 RESPONSE OBSERVATION
501 REAGENT RESERVOIR
502 REAGENT RESERVOIR
503 REAGENT RESERVOIR
504 PIPETTER MECHANISM
505 NOZZLE
506 ROBOT ARM
507 PIPE
508 SYRINGE PUMP
509 LIQUID FEEDING PUMP
510 SWITCHING VALVE
511 WATER TANK
512 CLEANING TANK
513 WASTE LIQUID TANK
601 WELL SUBSTRATE
602 WELL COMPONENT
603 HOLDER
604 LIQUID HOLDING SITE
605 WELL
606 OPENING PORTION
607 SEPTA
608 OPENING PORTION
701 LIGHT SOURCE
702 LIGHT SOURCE
703 DICHROIC MIRROR
704 FILTER UNIT
705 LENS
706 OBJECTIVE LENS
707 DICHROIC MIRROR
708 BAND PASS FILTER
709 BAND PASS FILTER
710 LENS
711 LENS
712 IMAGE SENSOR
713 IMAGE SENSOR

The invention claimed is:

1. An optical analyzing device comprising:
a light source;
a detector;
a substrate that has a metal film on at least one surface thereof; and
one optical element that introduces a light beam to the substrate from the light source through a first portion of the one optical element, and that guides the light beam from the substrate to the detector after the light beam exits the substrate through a second portion of the one optical element,
wherein a plurality of sample regions for holding samples are disposed on the metal film,
wherein a portion of the light beam from the light source is emitted to any of the sample regions, is reflected twice or more on the metal film, is reflected at least once on a surface opposite to a side having the sample regions in the substrate, and is not emitted to other sample regions excluding the sample regions in an optical path until the portion of the light beam is guided by the optical element, and
wherein a recess is disposed on a surface of the one optical element between the first portion of the one optical element and the second portion of the one optical element.

2. The optical analyzing device according to claim 1, further comprising:
a plurality of reagent holding units for holding a reagent; and
a plurality of valves for switching whether to feed the reagent to the sample regions from any of the reagent holding units.

3. The optical analyzing device according to claim 1, wherein a substance having a known reflectance is disposed between sample regions adjacent to each other.

4. The optical analyzing device according to claim 1, further comprising:
a gas cylinder that introduces CO2 to the substrate.

5. The optical analyzing device according to claim 1, further comprising:
a channel component that is connected to the substrate, and that has a groove for forming a channel on the substrate; or
a well component that forms a well for holding a liquid.

6. The optical analyzing device according to claim 1, further comprising:
a holder that fixes the substrate, a channel component, and the optical element to each other.

7. The optical analyzing device according to claim 1, wherein the substrate and the optical element have an integrated structure.

8. The optical analyzing device according to claim 1, wherein an index-matching liquid is disposed between the substrate and the optical element.

9. The optical analyzing device according to claim 1, wherein the substrate and the optical element are formed of the same material.

10. The optical analyzing device according to claim 1, wherein the optical element is a prism.

11. The optical analyzing device according to claim 1, wherein images in the detector which correspond to the respective sample regions do not overlap each other.

12. The optical analyzing device according to claim 1, wherein a light beam width (D/cos Θ) of the light from the light source is narrower than a width from one end to another end of the sample region, and is wider than the sum of widths of the sample regions which are concurrently measured.

13. The optical analyzing device according to claim 1, wherein a light beam width (D/cos Θ) of the light from the light source is narrower than a width of the reflecting region, and is wider than the sum of widths of the sample regions which are concurrently measured.

14. The optical analyzing device according to claim 12, wherein the light from the light source is concurrently emitted to a region including all of the sample regions at least at one point of time.

15. An optical analyzing device comprising:
a light source;
a detector;
a substrate that has a metal film on at least one surface thereof; and
one optical element that introduces a light beam to the substrate from the light source through a first portion of the one optical element, and that guides the light beam from the substrate to the detector side after the light beam exits the substrate through a second portion of the one optical element,
wherein a plurality of sample regions for holding samples are disposed on the metal film, and
wherein the substrate includes a reflecting member disposed on a surface opposite to a side having the sample regions,
wherein a portion of the light beam from the light source is emitted to any of the sample regions, is reflected twice or more on the metal film, and is reflected at least once on the reflecting member, and
wherein a recess is disposed on a surface of the one optical element between the first portion of the one optical element and the second portion of the one optical element.

\* \* \* \* \*